(12) United States Patent
Kennington (10) Patent No.: US 8,863,693 B2
(45) Date of Patent: Oct. 21, 2014

(54) ANIMAL TOILET

(71) Applicant: Brandon Kennington, Westlake Village, CA (US)

(72) Inventor: Brandon Kennington, Westlake Village, CA (US)

( * ) Notice: Subject to any disclaimer, the term of this patent is extended or adjusted under 35 U.S.C. 154(b) by 0 days.

(21) Appl. No.: 13/864,151

(22) Filed: Apr. 16, 2013

(65) Prior Publication Data

US 2013/0228133 A1 Sep. 5, 2013

Related U.S. Application Data (62) Division of application No. 12/620,484, filed on Nov. 17, 2009, now abandoned.

(60) Provisional application No. 61/115,847, filed on Nov. 18, 2008.

(51) Int. Cl.
*A01K 29/00* (2006.01)
*A01K 1/01* (2006.01)

(52) U.S. Cl.
CPC ............... *A01K 1/011* (2013.01); *A01K 1/0114* (2013.01); *A01K 1/0117* (2013.01)
USPC ........................................... 119/161; 119/165

(58) Field of Classification Search
USPC .................. 119/161, 163, 165, 166
See application file for complete search history.

(56) References Cited

U.S. PATENT DOCUMENTS

| | | | | |
|---|---|---|---|---|
| 3,318,285 A * | 5/1967 | Betham | ......................... | 119/163 |
| 3,590,398 A * | 7/1971 | Jetter | ................................ | 4/599 |
| 3,734,057 A * | 5/1973 | Lee et al. | ....................... | 119/163 |
| 3,771,491 A * | 11/1973 | Hunter | .......................... | 119/163 |
| 3,842,803 A * | 10/1974 | Temel | ............................ | 119/163 |
| 4,117,555 A * | 10/1978 | Dennis | .......................... | 119/163 |
| 4,527,511 A * | 7/1985 | Richards | ........................ | 119/161 |
| 4,649,578 A * | 3/1987 | Vargo | ............................ | 119/161 |
| 4,660,506 A * | 4/1987 | Nalven | .......................... | 119/163 |
| 5,048,463 A * | 9/1991 | Wilson et al. | ................ | 119/163 |
| 5,355,837 A * | 10/1994 | Reyes | ............................ | 119/161 |
| 5,458,090 A * | 10/1995 | Favreau | ........................ | 119/163 |
| 6,079,363 A * | 6/2000 | MacLaine | ..................... | 119/161 |
| 6,439,160 B1 * | 8/2002 | Wheelwright | ................ | 119/165 |
| 6,453,844 B1 * | 9/2002 | Janzen et al. | ................. | 119/163 |
| 7,114,464 B1 * | 10/2006 | Chang | ............................ | 119/479 |
| 2006/0249090 A1 * | 11/2006 | Ahad | ............................. | 119/163 |
| 2007/0068461 A1 * | 3/2007 | Hill | ................................ | 119/166 |
| 2007/0289541 A1 * | 12/2007 | Giardina | ....................... | 119/165 |
| 2008/0105207 A1 * | 5/2008 | Gloor | ............................. | 119/161 |
| 2008/0178817 A1 * | 7/2008 | Brewer | .......................... | 119/163 |
| 2010/0050951 A1 * | 3/2010 | Maguire et al. | .............. | 119/165 |
| 2013/0047928 A1 * | 2/2013 | Banasco | ....................... | 119/165 |
| 2013/0098301 A1 * | 4/2013 | Matsuo et al. | ................ | 119/169 |

* cited by examiner

*Primary Examiner* — Kimberly Berona
(74) *Attorney, Agent, or Firm* — Cislo & Thomas, LLP (57) ABSTRACT

Animal toilets presently do not have an automated method of cleaning the toileting surface and disposing of wastes. The animal toilet disclosed herein is equipped with a permeable toileting surface, a catchment surface underlying the toileting surface to collect and channel liquids, and a drain. The toileting surface may be equipped with a rinsing element to rinse wastes from the toileting and catchment surfaces. The drain may be further equipped with tubing to convey the liquids to a convenient disposal location. The animal toilet may be equipped with a moving toileting surface, which results in improved rinsing, and potential solid waste collection. In all embodiments, absorbent material may be used in place of permeable material for the toileting surface, which may not require any rinsing. The solid waste disposal may be automated through the use of rinse water and disposal tubing routed to the proper disposal location.

11 Claims, 8 Drawing Sheets

ANIMAL TOILET

CROSS-REFERENCE TO RELATED APPLICATIONS

This document is a divisional application of U.S. patent application Ser. No. 12/620,484, filed Nov. 17, 2009, which is related to, and claims the benefit of earlier filed U.S. Provisional Patent Application Ser. No. 61/115,847 filed on Nov. 18, 2008; all the subject matter of which are herein incorporated by this reference thereto in their entirety for all purposes.

BACKGROUND OF THE INVENTION

All animals have toileting needs. Having outdoor access for a pet or other animal, however, does not always alleviate the issue. In inclement weather, or late at night, the pet and/or owner may be reluctant to go outside. Older or disabled pets and/or owners may not be able to walk outside at all times. Owners may not always be home to walk or otherwise let the pet outside. Certain homes or businesses, such as high-rise apartments, do not have easy access to outdoor open spaces for toileting. In these situations, animal toileting devices are often necessary.

Conventional toileting devices for pets and other animals are often filled with compromises. The classic "litter box" has its messy litter and smell. Papers on the floor are rarely satisfactory from a sanitary and odor basis. Cedar shavings may mask the odor, but there is a question as to their respiratory effects on pets, and may not be suitable for larger animals. Moreover, these types of devices typically require a fair amount of labor to maintain.

There are currently pet toilets that allow liquid wastes drain into a catch basin. Some of these toilets have toileting surfaces comprised of permeable artificial turf that allow liquid wastes to drain through the turf and into a collection basin. What these devices lack is a feature that rinses the waste from the toileting surface and removes the associated odor. Current devices also lack any sanitizing features for the toileting surface.

TECHNICAL FIELD OF THE INVENTION

This invention relates to animal toilets.

SUMMARY OF THE INVENTION

The animal toilet described herein is generally comprised of a platform, a toileting surface, a rinsing element for the toileting surface, and a drain. Optional elements may include plumbing for the drain, a moving toileting surface, a drive element to move the toileting surface, an actuator element to trigger the drive element, and a sanitation element for the toileting surface. In addition, the moving toileting surface embodiment may incorporate a solid waste collection and disposal feature that utilizes the movement to collect solid wastes. Alternative embodiments may include a toileting surface that is absorbent and disposable, which may not require rinsing.

In one embodiment, the animal toilet comprises a permeable toileting surface comprised of sod, underlain by a catchment surface containing a drain, which drain is underlain by a collection element comprising a catch basin or a disposal tube. Given the natural sod, animals will be encouraged to use the surface for toileting. To keep the sod alive and to rinse the liquid wastes off the sod, the sod should be watered every few days or so. Liquid wastes and rinse water will seep into the sod, and any excess will travel down the catchment surface into the drain and into the collection element. For those embodiments equipped with a disposal tube, the tube may terminate in any appropriate disposal area, including a floor drain, sanitary sewer, rain gutter, flower bed, septic system including miniature septic systems for animal wastes, etc. Once the animal is trained to use the sod, it may be replaced with longer-lasting artificial turf, or other suitable toileting surfaces, including an absorbent material that may not require rinsing. Such surfaces may also be used in place of the sod entirely. Alternatively, the catchment surface and toileting surface may be the same, with no separate toileting surface.

In another embodiment of the animal toilet, it may be equipped with a rinsing element, which may be mounted on or near the catchment and/or toileting surface. In one embodiment, the rinsing element is comprised of one or more sprinkler heads that are plumbed underneath the catchment surface, and poke up through the catchment surface and the toileting surface. When operated, the sprinkler heads spray onto the toileting surface to water and rinse any liquid wastes away. The rinsing element may be controlled by an actuator, which may be as simple as a water timer connected with a faucet, or may be sophisticated as a moisture sensor, weight sensor, IR sensor, photoelectric eye, or motion detector to determine when the animal has been on the toilet and has moved off. Such actuator may also be equipped with a logic chip to control the rinsing to prevent over-cycling. The rinsing liquid may be water and/or other substances. A dispensing element may mix up chemicals or enzymes automatically into the rinsing liquid to improve odor control, cleaning, sanitization, and/or biodegradation.

In another embodiment, the toileting surface may move, which may permit solid waste collection and better rinsing. The toileting surface may be comprised of a continuous loop of permeable material, underlain by and wrapped around a support surface, and engaged by at least one roller to move the toileting surface across the support surface. Below all of this is a catchment surface to collect any liquid wastes and rinsing liquid. The rinsing element may be positioned at one end of the support surface, to spray rinsing liquid directly at the toileting surface from a close distance. The rinsing liquid could be water, hot or cold, or steam. A sanitizing element could also be implemented, preferably at the other end of the support surface, to use chemical or physical sanitizing methods on the toileting surface, such as UV light, steam, heat, or liquid sanitizers. A dryer of high pressure and/or warm air could be used in the same location to dry the toileting surface.

Alternatively, the toileting surface may be an absorbent material, whose underside may be bonded to an impermeable material. Such a surface would trap liquid waste, rather than allow it to seep through the toileting surface. In such an embodiment, there may be a roller located on each end of the support surface, one being a feed roll, the other a takeup reel for the soiled toileting surface.

Moving the toileting surface may also allow for the collection of solid wastes. Placing a solid waste collection element at one end of the support surface, the solid waste can be dislodged as the toileting surface is moved past the edge of a collection surface, and guided into a solid waste container for later disposal. In another embodiment, the solid waste disposal could be automated, by using sufficient water and a large diameter disposal pipe connected to the solid waste container, the solid wastes could be gravity fed to an appropriate disposal area. Alternatively, the solid wastes could be chopped up in a disposer, then flushed with water to the disposal area. In another embodiment, the solid wastes could be chopped up and/or transported by a pump, which could pump the solid waste and rinsing liquid to a disposal area, which could be higher than the animal toilet, such as a laundry room washing machine sewer or a toilet, or other remote location.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
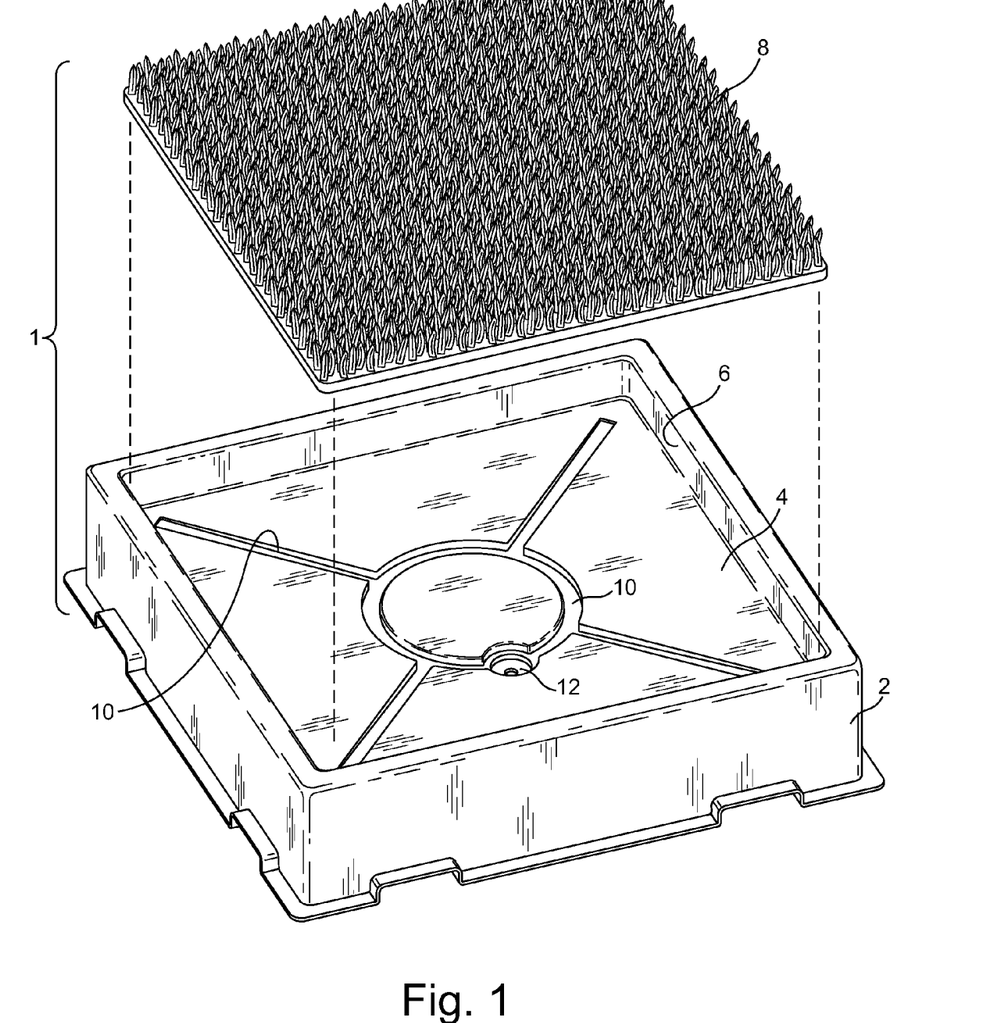
FIG. 1 is an exploded perspective view of an embodiment of the animal toilet.
Figure 2:
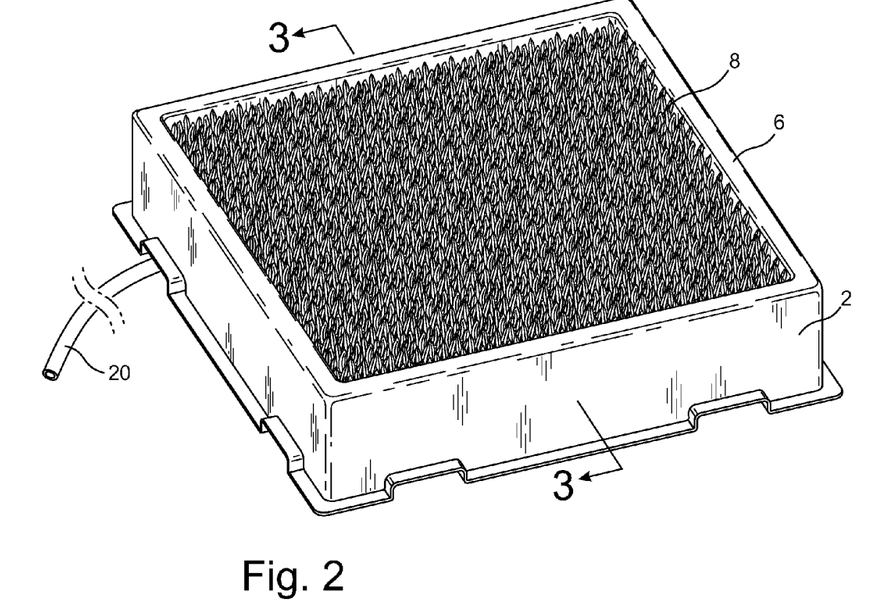
FIG. 2 is an assembled perspective view of an embodiment of the animal toilet with an optional disposal tube.
Figure 3:
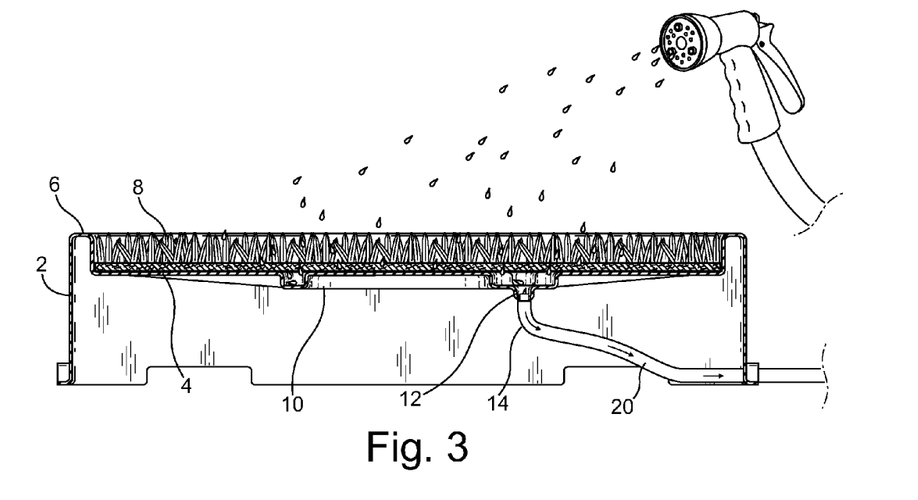
FIG. 3 is a cross section view of an embodiment of the animal toilet and its operation.
Figure 4:
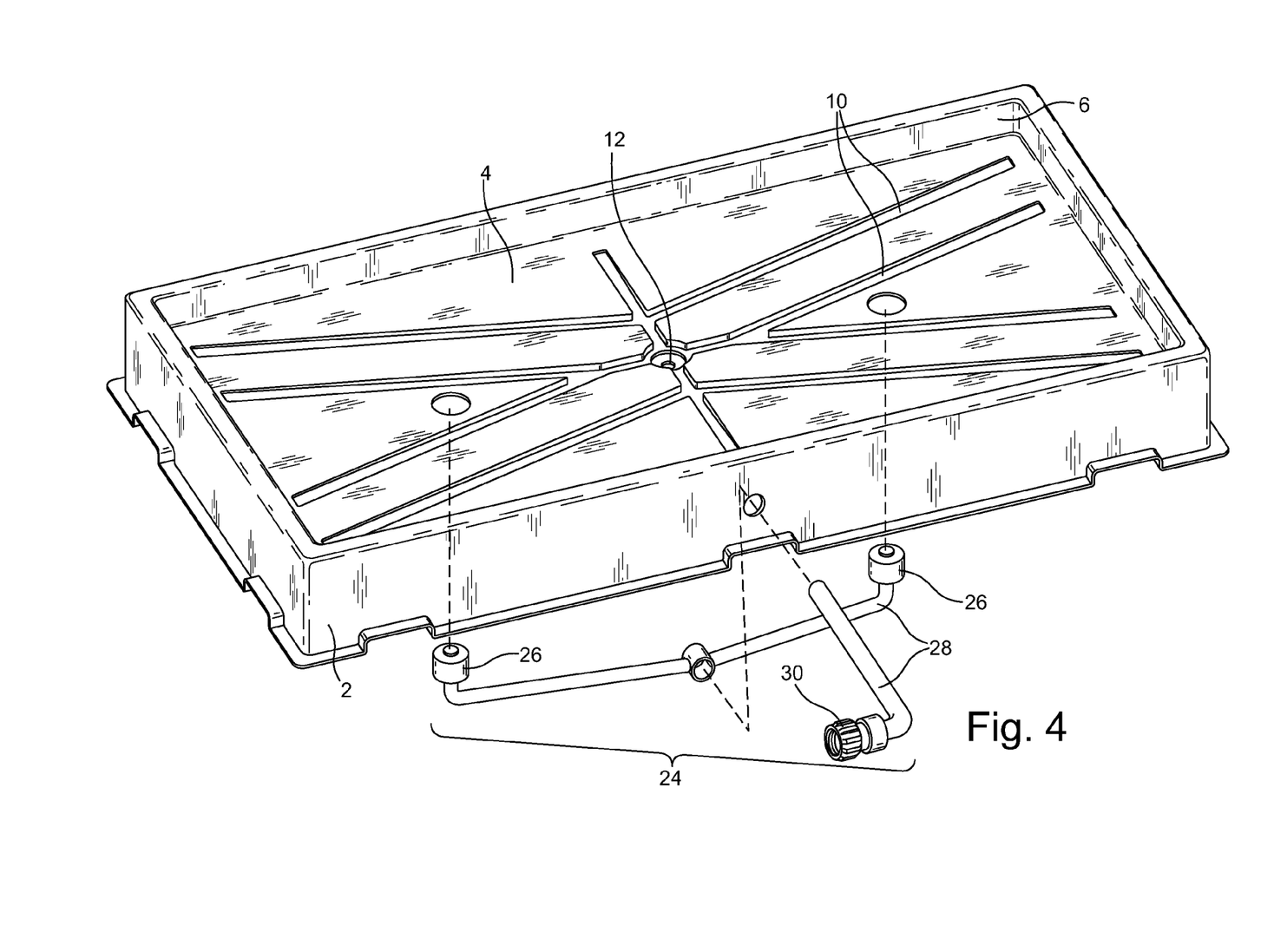
FIG. 4 is a perspective exploded view of an embodiment of the animal toilet with a rinsing element.

In one embodiment, the animal toileting device 1 comprises a platform 2, which may be made out of wood, plastic, or other suitable material. As shown in FIGS. 1-3, the platform 2 may be connected with a catchment surface 4. The platform 2 may also have a circumferential or partially circumferential lip 6, rising above, or integrated into the catchment surface 4. This lip 6 may have at least one substantially vertical surface. The catchment surface 4 may be flat, or it may be sloped or generally concave. Alternatively, the platform 2 and the catchment surface 4 may be formed as a single piece, such as with plastic injection molding. In such an embodiment, or the embodiment with a separate catchment surface 4, the substantially vertical surfaces of the platform 2 and/or lip 6 may be set at draft angles that will allow for easy stacking of the platforms, which reduces the space necessary to store and ship bulk quantities of the animal toileting devices.

The catchment surface 4 may comprise the toileting surface, or may be overlain by a separate toileting surface 8. The catchment surface 4 may be flat, and be equipped with one or more drainage channels 10. The drainage channels 10 may be sloped down to a drain 12, which comprises a hole in the floor of the catchment surface 4, preferably at its low point. The drainage channels 10 may be widely spaced and configured to run from the edges and the corners of the catchment surface 4, or in any suitable arrangement. Alternatively, the catchment surface 4 may be sloped or generally concave, with a drain 12 preferably at the low point.

Underlying the drain 12 is a collection element 14. The collection element 14 may be a simple catch basin to collect liquid wastes for eventual manual disposal. The catch basin may be placed in a drawer inside the platform 2, for ease of access. Alternatively, the catchment surface 4 and/or some portion of the platform 2 may be removable and/or fitted with a hinge, so that they can be lifted to access the catch basin.

Figure 6:
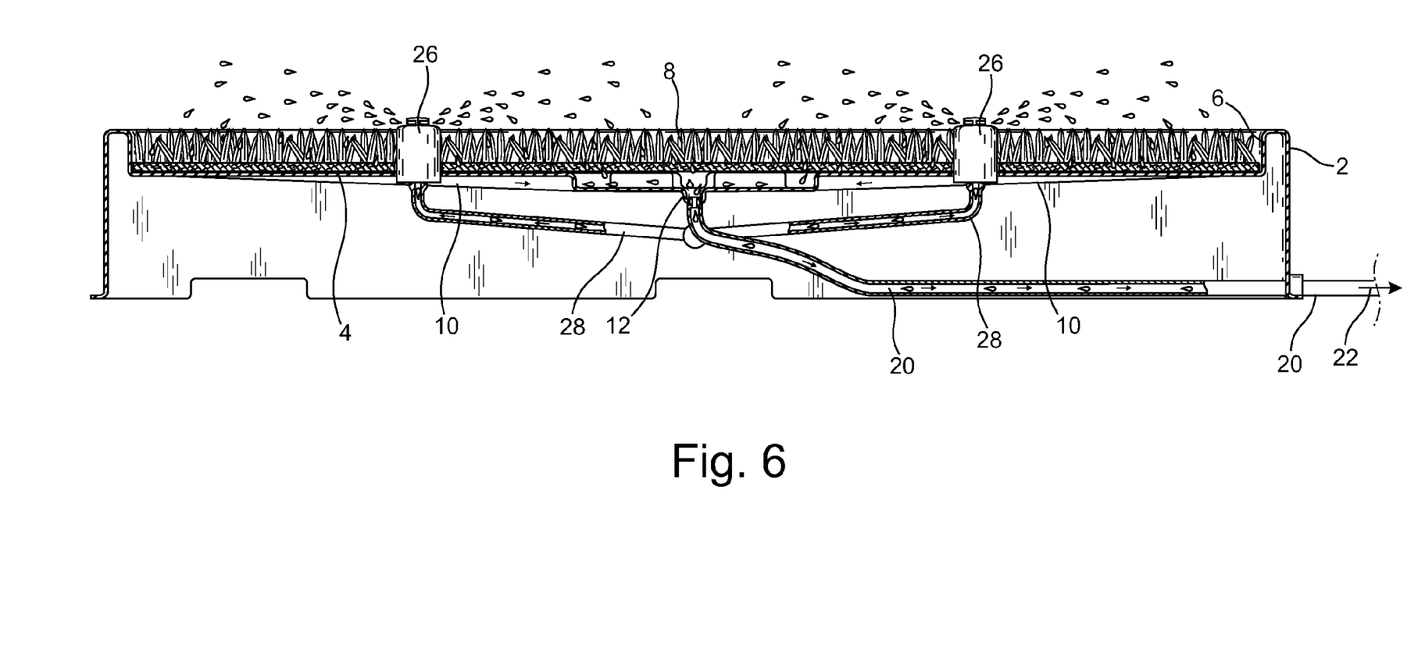
FIG. 6 is a cross section view of an embodiment of the animal toilet with a rinsing element, a disposal tube, and their operation.
Figure 9:
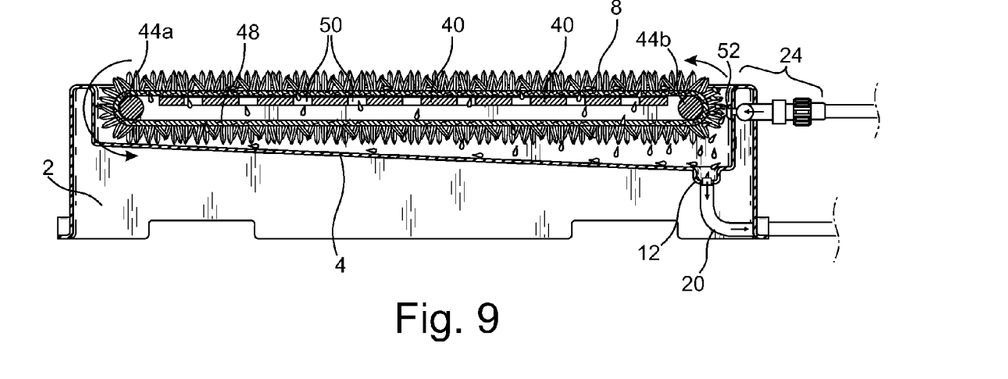
FIG. 9 is a cross section view of an embodiment of the animal toilet with a moving toileting surface.

Alternatively, as shown in FIGS. 3, 6, and 9, the collection element 14 may comprise a fitting that couples with the drain 12, and is attached to a disposal tube 20, such as a hose, piping, or other liquid conveyance, which can then be run to any convenient disposal location 22. Such disposal locations 22 may include patio drains, floor drains, rain gutters, flower beds, storm drains, toilets, or sanitary sewers. Since the discharge is primarily water, the odor from the wastes is not likely to be an issue. Alternatively, the disposal location 22 could be a small hole, which may be filled with coarse sand and/or gravel, or simply covered with a lid, with the hose or piping run to the bottom of the hole, which would allow the liquid to drain into the soil without being present at the surface. The disposal tube 20 may be adapted to fit the drain opening 12 in a number of ways, including a fitting on the drain opening 12, or secured below the drain opening 12 without touching the opening, or various other methods that are suitable for the disposal tube 20 to collect any material that falls through the drain opening 12.

Figure 5:
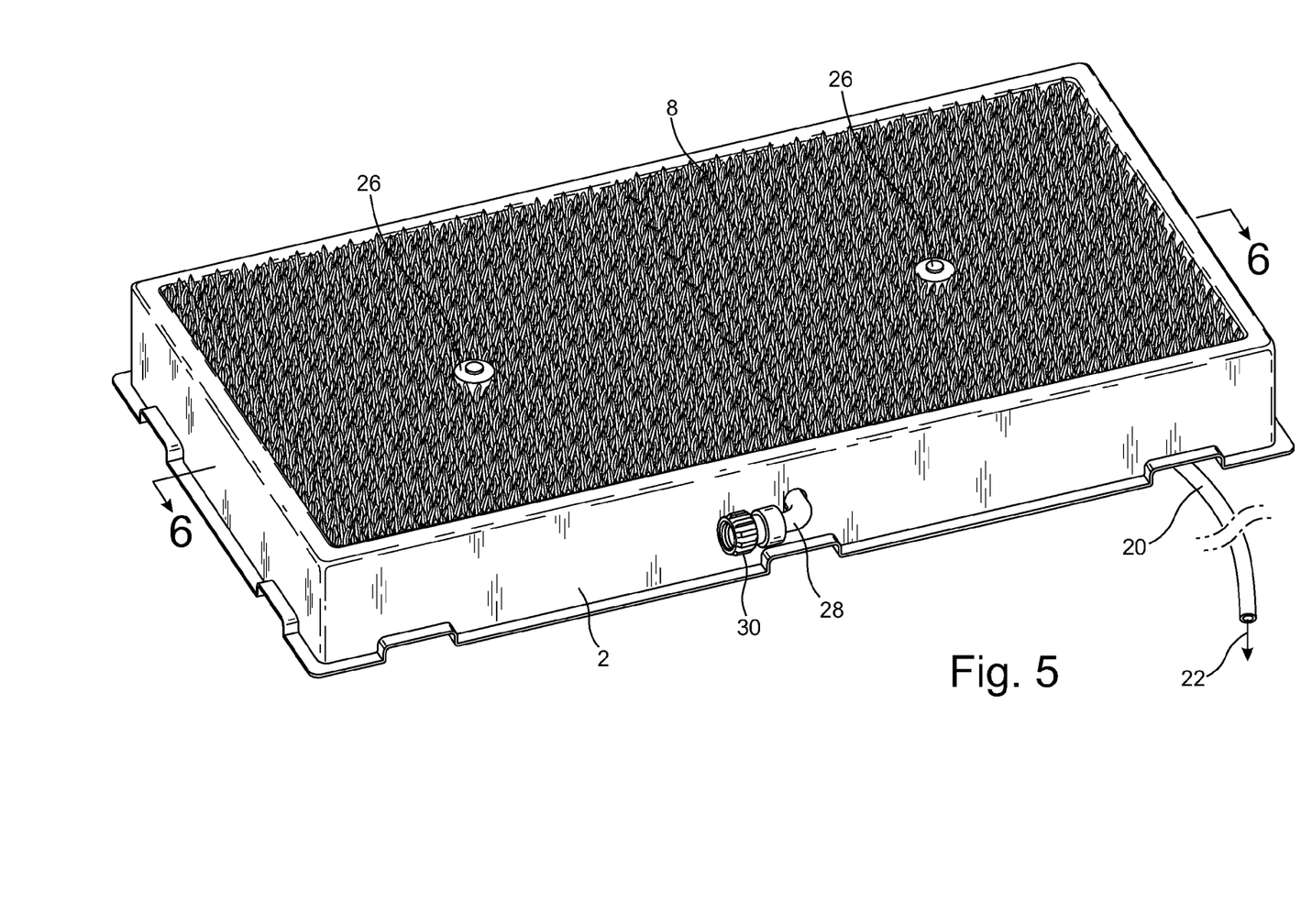
FIG. 5 is a perspective assembled view of an embodiment of the animal toilet with a rinsing element and disposal tube.

A toileting surface 8 may be used atop the catchment surface 4. As shown in FIGS. 1, 2, and 5, such toileting surfaces may comprise live grass, permeable artificial turf, grating, grills, slotted or perforated surfaces, or other suitable material capable of draining liquids onto the catchment surface 4. In a preferred embodiment, the toileting surface 8 may be a soil-less grass sod. This sod may act as a "training" toileting surface 8, as animals are familiar with natural grass and tend to be attracted to such surfaces for toileting. Being soil-less, this sod does not lose soil or create a muddy residue that can clog the drain 12 or the collection element 14, and it is lighter and thus cheaper to ship than sod with soil. Pet wastes may tend to "burn" real grass, and thus it may eventually die, although some grasses are more resistant to burning than others. After a few weeks or months, when the animal has been trained to use the sod surface, it can be replaced with artificial turf, which is long lasting and maintains its appearance without any need for water or maintenance. Artificial turf has another advantage in that it can be used with a wide variety of odor-reducing and/or cleaning chemicals or enzymes, or high pressure water, steam, or mechanical cleaning tools, without any deleterious effects on the turf, whereas live grass may be damaged by such treatment. Artificial turf may also be laundered in a washing machine, although that may shorten its useful life. Alternatively, worn-out soil-less sod may be replaced with more soil-less sod. Sod with soil may also be used as a toileting surface 8.

Alternatively, absorbent material may be used as a toileting surface 8. Such a toileting surface 8 may incorporate a plastic or other impermeable layer underlying the absorbent material so that any liquids will stay in the absorbent material and not drain onto the catchment surface 4. Preferably, the absorbent material will be an inexpensive, disposable item that can be changed frequently, and may be equipped with deodorant or other odor-fighting materials and/or anti-bacterial or sanitizing agents.

As shown in FIGS. 3-6, the animal toileting device may be equipped with a rinsing element 24. The rinsing element 24 may comprise a hose with or without a nozzle, a sprinkling can, or one or more lawn sprinkler heads 26 mounted into the catchment surface 4, platform 2, or other suitable structure, and if equipped with a separate toileting surface 8, may penetrate the toileting surface 8. The sprinkler head 26 may be plumbed beneath the catchment surface 4 using standard lawn sprinkler plumbing 28, and routed outside the platform 2 where it may be equipped with a fitting 30 for a garden hose or other suitable water source. The fitting 30 may then be attached to a garden hose attached to a hose bib or faucet. When the water is turned on, the sprinkler, which is adapted to have a short spray circumference or simply a flooding function, sprays the toileting surface 8 with water, rinsing wastes off of the toileting surface 8 and onto the catchment surface 4, where they flow into the drain 12 and into the collection element 14. If the water volume is sufficient over a short period of time, the entire catchment surface 4 may be flooded, ensuring sufficient rinsing even if the spray circumference does not reach the outer edges of the toileting surface 8.

A dispensing element 32 may be employed to dispense odor-reducing, cleaning, or sanitizing chemicals or enzymes into the rinsing liquid. Numerous siphon mixers are available that attach to a hose bib or faucet, and then attach to the hose for automatic mixing as the water flows. The enzymes or other agents introduced into the rinsing liquid in this manner may also be for assisting biodegradation or dissolving of solid or liquid wastes.

The device may also be equipped with an actuator element 34, which triggers the rinsing liquid to flow into the rinsing element 24. Actuator elements 34 may comprise a variety of mechanisms, including but not limited to a timer, a moisture sensor, a weight sensor, an IR sensor, a motion sensor, light beam, or other suitable device. A timer may be connected with a hose bib or faucet, or may be permanently plumbed, so that it allows water flow for a certain time period, at a user-selected interval. In testing the animal toilet, it appears that three gallons of water, every 2-3 days, provides sufficient rinsing. A water timer, set to allow water to flow for up to a few minutes every 2 or 3 days, preferably when the animal is sleeping, may accomplish this task. Alternatively, a moisture sensor may be used to determine if an animal has deposited sufficient liquid waste on the toileting surface 8, which will then trigger a valve to supply water for a short interval. A logic chip may require some minimum time to pass, typically hours, before the valve may be opened again, to prevent too-frequent cycling. The moisture sensor could be adapted to differentiate between water and urine, as the latter typically has a higher conductivity. A weight sensor, IR (infrared) sensor, motion sensor, or light beam sensor could also be used either alone or in any combination with each other or the moisture sensor, to detect when the animal has been on the toileting surface 8, and to actuate the rinsing element 24 after the animal has departed. Similar logic chips can be programmed with these sensors to prevent too-frequent cycling.

In addition to the toileting surface 8, some dogs, particularly males, require a "target" on which to urinate. Thus, the animal toileting device may be equipped with a targeting element 36, which may be a relatively vertical member that can be readily rinsed or washed. In a preferred embodiment, the targeting element 36 may be a miniature plastic fire hydrant, weighted on the bottom to stand upright on the toileting surface 8, but any suitable target may be used. Alternatively, the targeting element 36 may be affixed to the catchment surface 4 and/or the toileting surface 8, either permanently or detachably. Alternatively, a rinsing element 24 may be mounted inside the targeting element 36 so that the targeting element 36 and the surrounding toileting surface 8 are rinsed when the rinsing element 24 is actuated. To capture any target overshoot, raised walls 38 may be located around the targeting element 36 to insure that any mis-aimed urine streams drain onto the toileting and/or catchment surfaces 4.

Figure 7:
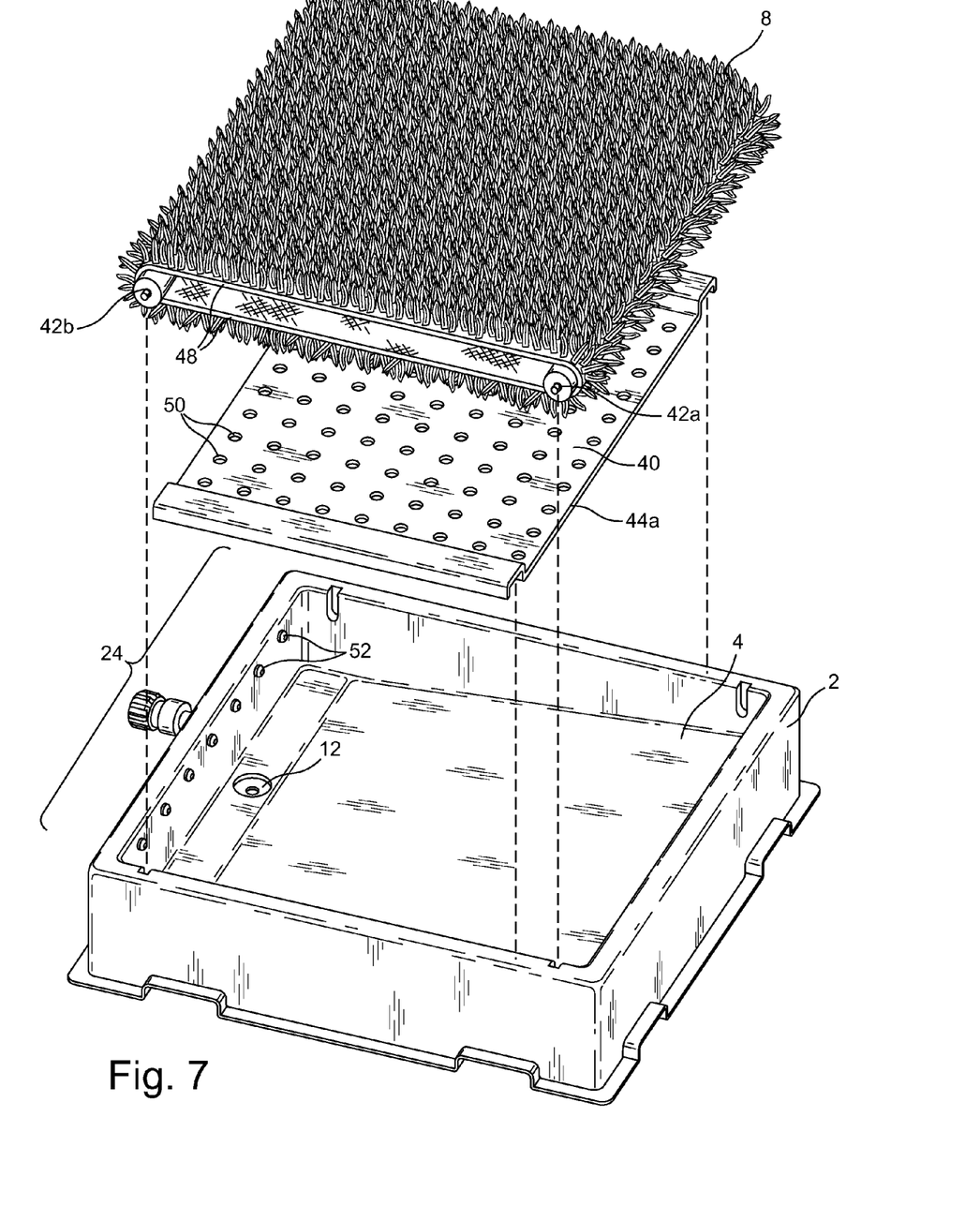
FIG. 7 is an exploded perspective view of an embodiment of the animal toilet with a moving toileting surface.
Figure 8:
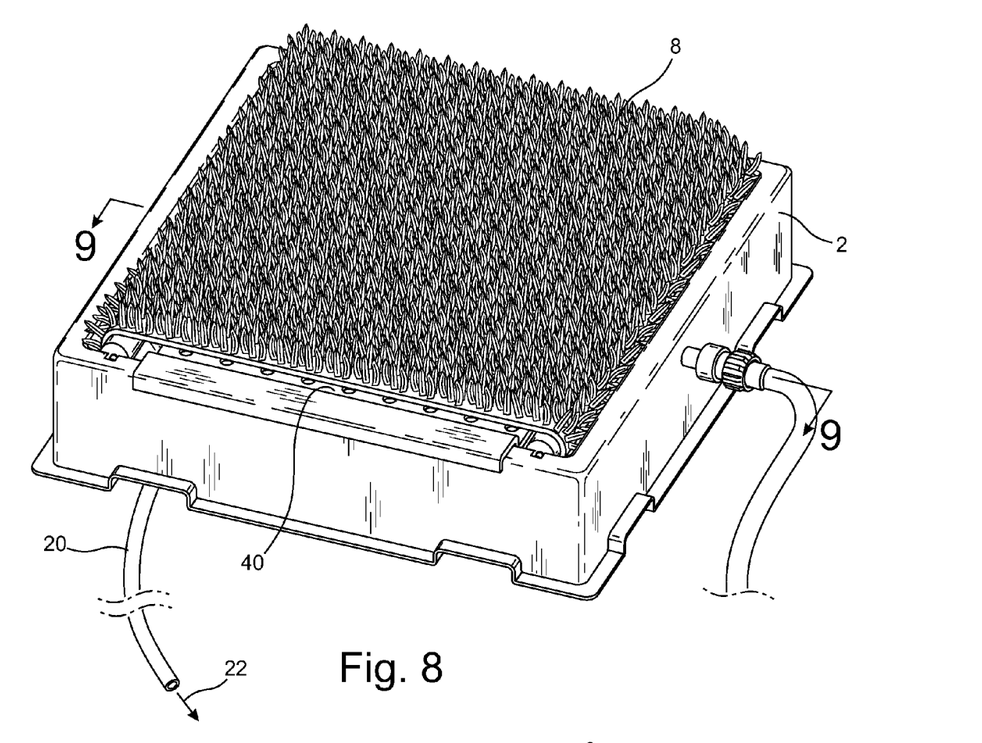
FIG. 8 is an assembled perspective view of an embodiment of the animal toilet with a moving toileting surface.

In an alternative embodiment, the animal toileting device may be equipped with a moving toileting surface. As shown in FIGS. 7-9, a support surface 40 may be connected with the platform 2, to underlie and support the toileting surface 8. Underneath the support surface 40 at some distance, is a catchment surface 4 that is sloped and/or channeled towards a drain 12. The drain 12 may be connected with a fitting and a disposal tube 20, such as a hose, pipe, or other liquid conveyance, as described above, and said disposal tube 20 could be routed to a nearby disposal location 22. To move the toileting surface 8, a first roller 42a may be located proximate to a first end 44a of the support surface 40, to engage the toileting surface 8 and move it along the support surface 40. Alternatively, the first roller 42a may be located elsewhere, such as underneath the support surface 40, outside the platform 2, or any other suitable location. The first roller 42a may be connected with a drive element 46 to turn the roller and move the toileting surface 8 across the support surface 40. The toileting surface 8 may substantially cover the support surface 40 and extend beyond the ends 44a, 44b of the support surface 40.

In a preferred embodiment, the toileting surface 8 may be comprised of a continuous loop of material 48, routed over the support surface 40, around the first roller 42a and under the support surface 40. In another embodiment, a first roller 42b could be located proximate to the opposite end of the support surface 40 as the first roller 42a, and the continuous loop of material 48 may be routed around both rollers and over and under the support surface 40. Alternatively, the support surface 40 could have sufficiently rounded and smooth ends such that rollers are not required at either or both ends of the support surface 40, and the first roller 42a for driving purposes may be located at some other convenient location. The toileting surface 8 could be comprised of a variety of materials, such as a flexible and permeable artificial turf, preferably non-absorbent, but any suitable material with sufficient flexibility and durability may be used.

In another embodiment, the toileting surface 8 may be comprised of an absorbent material to capture rather than drain liquid wastes. The absorbent material may be underlain by plastic or other impermeable material, bonded to the absorbent material, to insure that liquid is retained. The absorbent material may also be equipped with deodorizing agents, sanitizing agents, or agents that attract animals to use it as a toileting surface 8. Two rollers could be positioned so that the first roller 42b is a feed roll, and the first roller 42a is a takeup reel for the soiled toileting surface 8. By winding the takeup reel so that the toileting surface's impermeable side is on the outside of the roll, leaks and odors from the soiled roll may be minimized.

When using an absorbent material as a toileting surface 8, the support surface 40 may be impermeable, since there are no liquids to drain through the support surface 40. Where the toileting surface 8 is permeable, the support surface 40 may also be permeable, such as having perforations 50, to allow liquids to drain through the support surface 40. In the embodiment with the continuous loop of toileting surface 48, liquid would also drain through the toileting surface 8 running underneath the support surface 40.

Alternatively, the support surface 40 could be impermeable. In such an embodiment the support surface 40 could be made to drain on one side, both sides, or even the ends, using a sloped surface, drainage channels, a convex shape, or even a flat shape, to direct the liquids to the desired location. By directing the liquids to the sides of the support surface 40, it may avoid draining the liquids through the toileting surface 8 that runs underneath the support surface 40, which may help to minimize odors and prevent debris accumulation in the underside of the toileting surface 8.

This embodiment may also be equipped with a rinsing element 24. The rinsing element 24 may comprise one or more nozzles 52 located proximate to one of the rollers, which may direct water, hot water, or steam onto the toileting surface 8 as it moves past the nozzle(s). Hot water or steam may be supplied by a small water heater and/or steam generator powered by electricity. Hot water may also be supplied from a household hot water supply, such as a water heater or boiler. Such a configuration allows for high pressure water or steam to be sprayed directly at the toileting surface 8 for improved cleaning action. As discussed above, cleaning or deodorizing chemicals or enzymes could also be mixed with the water or other liquid before applying it to the toileting surface 8.

The direction of movement of the toileting surface 8 during rinsing may accomplish different objectives. If the freshly-rinsed surface is moved atop the support surface 40, it will help to rinse the support surface 40 as the rinsing liquid drains off the toileting surface 8. To leave the toileting surface 8 as well-drained as possible, the drive element 46 may continue to turn the first roller 42a to move the toileting surface 8 after the rinsing has ceased, so that the toileting surface 8 does a complete rotation after the rinsing ceases, to allow the toileting surface 8 to pass under the support surface 40 and drain as completely as possible. Alternatively, if the freshly-rinsed toileting surface 8 is moved in the other direction, underneath the support surface 40, it may be drained as well as possible when it has rotated to the top of the support surface 40. This configuration may take less time, since moving the toileting surface 8 and using the rinsing element 24 may be stopped at the same time, with the toileting surface 8 being well-drained. Alternatively, the device may be equipped with a dryer, which directs cold, warm, or high pressure air, or radiant heat, at the toileting surface 8 after it has been rinsed.

Figure 11:
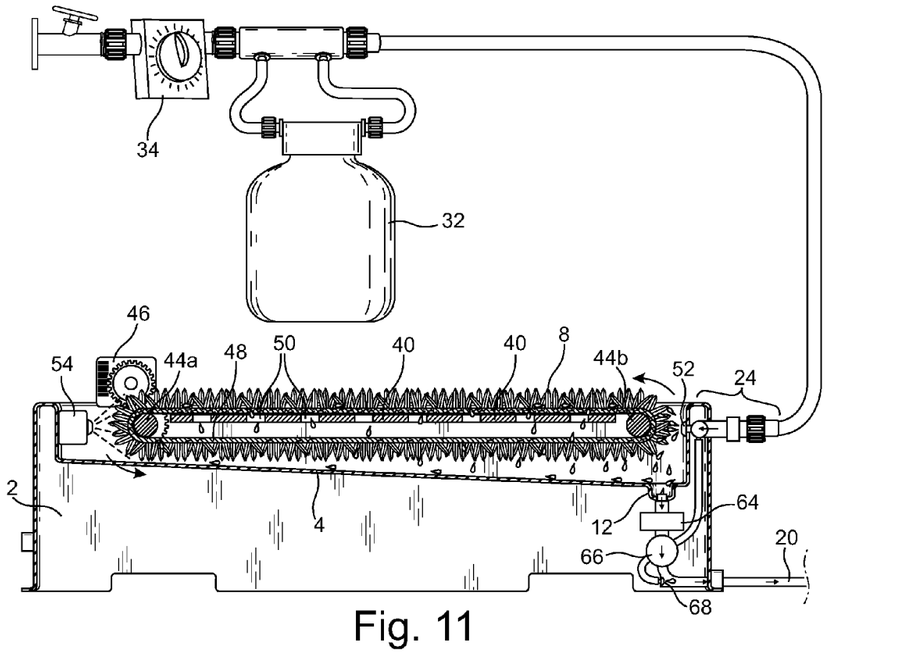
FIG. 11 is a cross section view of an embodiment of the animal toilet with a moving toileting surface and additional elements.

In addition, a sanitation element 54 may be used with the toileting surface 8. Such an element may comprise a wide variety of sanitizing methods, including, but not limited to, steam, UV light, heat, and disinfecting liquid, or any combination thereof. Steam and/or disinfecting liquid may be applied via the rinsing element 24 as discussed above, or they may have their own dedicated set of nozzles/sprinklers. If the rinsing element 24 is located at one end of the support surface 40, a UV light may be used for disinfection at the other end, after the cleaned toileting surface 8 has traveled underneath the support surface 40 and drained along the way. The UV light may be positioned so that it has sufficient exposure time to accomplish the disinfecting task, preferably out of the line of drainage for the toileting surface 8, such as at one end of the platform 2 with the light directed horizontally at the roller. Such a position will allow the light to be exposed to more of the toileting surface 8, as that surface is spread open by the action of going around the roller. For UV disinfection, the toileting surface 8 should be resistant to UV degradation, which is the case for most artificial turf. Heat disinfection may be applied in a variety of methods, such as a radiant heat element or blown hot air, which may also act as a dryer. Heat should be carefully calibrated so that the toileting surface 8 is not overexposed to heat to the extent that it may adversely affect its life.

Alternatively, the rinsing and/or sanitation elements may be comprised of a dip tank positioned between the support surface 40 and the catchment surface 4. Another roller may be utilized to guide the toileting surface 8 into the dip tank, with the roller positioned in or just above the dip tank. Alternatively, the catchment surface 4 could be used as a dip tank, by blocking the drain 12 and filling the catchment surface 4 with rinsing and/or sanitation liquid, then the drain could be unblocked to allow the liquid to drain out.

The drive element 46 may comprise any number of drive mechanisms to turn the first roller 42a. These may include, but are not limited to, electric motors, motors driven by water pressure/flow or steam pressure/flow, and manual cranks. The electric motor may be powered by a wall outlet, although a battery powered electric motor may be used. In a battery-powered configuration, rechargeable batteries may be used, including those recharged by a solar array, which may be mounted on the exterior of the platform 2 or remotely, if the device or the remote array is exposed to sufficient light. The motor may be actuated by a switch, or may be triggered when the rinsing element 24 is engaged by coupling a pressure sensor in the rinsing element 24 plumbing to the switch. When the rinsing element 24 plumbing is pressurized, the sensor may send a signal to a logic chip or the motor itself, which may actuate a relay to provide power to the motor. Or the signal could be generated by the mechanism that actuates the water flow, for example, if the water flow is controlled by a timer, the timer could not only open the water valve to commence flow, but may also provide a signal to the relay and/or provide electricity to the motor while the valve is open, or at some other interval.

Alternatively, drive mechanisms powered by water have the advantage of not needing any electric power, making them suitable for use where only water is available. When water is routed to the rinsing element 24, it could first be run through a water impeller or turbine, which drives a mechanism coupled with the first roller 42a to turn that roller and move the toileting surface 8. Steam could also be used if there is a source of power to generate the steam.

Manual cranks may be used for the drive element 46, which reduce the complexity and increase the reliability of the drive mechanism. Such cranks could be a small crank that is permanently or detachably coupled with the first roller 42a, which turns the roller and moves the toileting surface 8. The crank may be directly connected with the roller, or may be indirectly connected through gears, belts, chains, or other suitable mechanisms. Such a mechanism would be ideally suited for the embodiment using the absorbent material for the toileting surface 8, although it may be used for other embodiments. The absorbent material embodiment may also be used with the drive elements discussed above.

This embodiment may be equipped with an actuator element 34 similar to those discussed above, including but not limited to a timer, a moisture sensor, a weight sensor, an IR sensor, a motion sensor, light beam, or other suitable device. The actuator element 34 may actuate any combination of the above-described elements, including any combination of the rinsing element 24, the drive element 46, and the sanitation element 54. The embodiment that employs the absorbent material for the toileting surface 8 may also be used with an actuator element 34 that triggers the toileting surface 8 to move to a fresh surface at some set frequency, such as once or twice a day, or other suitable interval.

Figure 10:
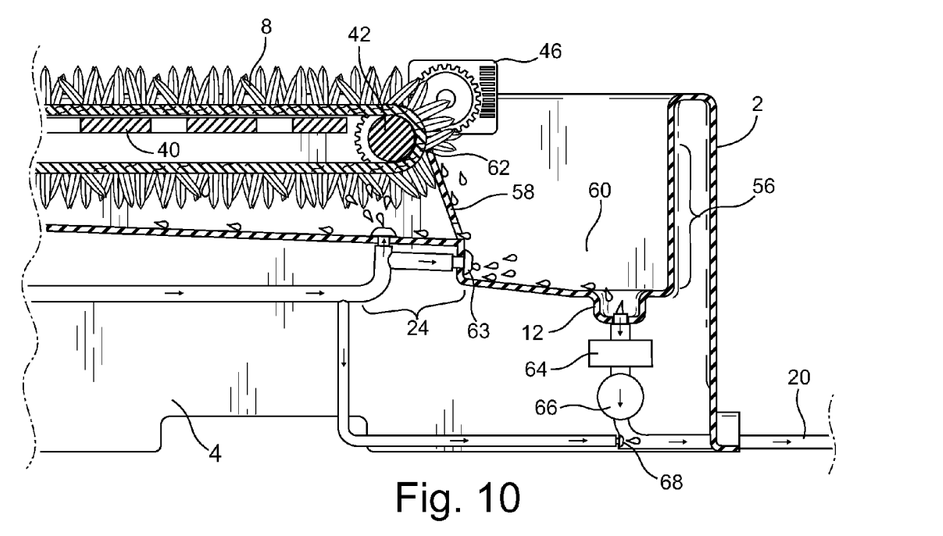
FIG. 10 is a cross section view of an embodiment of the animal toilet with a moving toileting surface, solid waste collection and automated solid waste disposal.

This embodiment may also be equipped with solid waste collection element 56. Such an element may comprise a collection surface 58 and a solid waste container 60. Preferably, the collection surface 58 is located proximate to the first or second roller 42*a*, 42*b* or proximate to the end of the support surface 40 if no roller is used, such that the edge of the collection surface 58 is very close to the toileting surface 8 and may even graze the toileting surface 8 when it is moved past during the actuation of the drive element 46. The top edge 62 of the collection surface 58 may extend the full width of the toileting surface 8, and the collection surface 58 is steeply sloped from that edge 62 down into a solid waste collection container, which may be a rectangular shape with an open-top. When the drive element 46 is actuated, the toileting surface 8 and any solid waste thereon will move in the direction of the collection surface 58 and solid waste container 60. The edge 62 of the collection surface 58 will act to scrape the solid waste off the toileting surface 8 and onto the steeply sloped collection surface 58, where the waste will fall down into the solid waste container 60. Preferably, the edge of the collection surface 58 will be located at or below the center of the radius of the roller or the rounded edge of the support surface 40 if no roller is used, so that the change in angle of the toileting surface 8 as it moves over the roller will facilitate moving the solid waste off the toileting surface 8 and onto the collection surface 58. Alternatively, the collection surface 58 may be very short and/or flush with the top of the solid waste container 60 if the edge of the collection surface 58 is below the bottom of the roller or below the exterior radius of the end of the support surface 40 if no roller is used. This configuration would allow gravity to do most of the work to drop the solid wastes into the solid waste container 60, with any remnants scraped off by the collection surface edge 62. Cleanup of the solid waste collection element 56 can be minimized by covering the collection surface 58 and/or the solid waste container 60 with a disposable liner, such as an ordinary plastic bag, or one that is specially configured to cover these areas. The solid waste container 60 could be equipped with solid or liquid material to encapsulate, deodorize, and/or mask the odor. In any of these embodiments, the toileting surface 8 would then move past the collection surface 58 and to the rinsing element 24 for rinsing and/or sanitizing.

Alternatively, the solid waste disposal could be automated. The solid waste container 60 could be co-located with the low point of the catchment surface 4 so that all liquids and solid waste end up in the same place. With sufficient water rinsing, and sufficient disposal tube (piping, hose, etc.) diameter, the solid wastes could be flushed away, preferably to a sanitary sewer or a septic system, including miniature septic systems such as a "Doggie Dooley"® or similar system. To assist such flushing, spray nozzles 63 could be located in the solid waste container 60 and/or the disposal tube 20 to direct the solid waste into the drain 12 and transport it down the disposal tube 20.

To facilitate transporting the solid waste into a household sanitary sewer, the drain 12 could be equipped with a "disposer" 64 that chops the solid waste into small pieces. Water from rinsing, or a dedicated disposal cycle, could mix water with the ground solid waste before or while discharging the resulting slurry to the sewer. In such a system, the disposer could be equipped with a lift element, which could be a pump 66 or water pressure 68 (with or without a one-way valve) to assist lifting the slurry to a suitable sewer pipe, such as a washing machine sewer connection in a laundry room, or even into a toilet. In another embodiment, the pump 66 may provide sufficient chopping action to dispense the need for a separate disposer 64, and could be equipped with a one-way valve to prevent backflow. Sewage pumps or trash pumps may be suited for this application.

The solid waste collection element 56 may also be used with the embodiment that uses the absorbent material, and located as described above. The takeup reel for the absorbent material may be located beneath the support surface 40, so that the solid waste is removed from the toileting surface 8 as the toileting surface 8 is pulled around the end of the support surface 40 (or another roller at the end of support surface 40) and past the collection surface 58, then the toileting surface 8 is rolled onto the takeup reel located beneath the support surface 40 or at some other suitable location. This action removes the solid waste from the toileting surface 8 and rolls the toileting surface 8 containing the liquid wastes onto the takeup reel. The solid waste collection element 56 may equipped for automated waste disposal using water in the containment element and/or a disposer, as discussed above.

While the present invention has been described with regards to particular embodiments, it is recognized that additional variations of the present invention may be devised without departing from the inventive concept.

What is claimed is:

1. An animal toileting device, comprising:
 a platform;
 a flat catchment surface supported by the platform, the flat catchment surface comprising at least one hole created in the flat catchment surface;
 a lip that at least partially surrounds the catchment surface;
 a permeable toileting surface atop the catchment surface;
 a fitting for a water connection, which fitting is connected with plumbing;
 a sprinkler head connected with the plumbing and inserted through the flat catchment surface through at least one hole in the catchment surface, which directs water onto the toileting surface;
 a drain opening located in the catchment surface;
 a plurality of widely-spaced drainage channels inset in the catchment surface that slope downward to the drain opening; and
 a disposal tube adapted to fit the drain opening.

2. The animal toilet of claim 1, further comprising:
 an actuator element that provides water to the sprinkler head.

3. An animal toileting device, comprising:
 a platform;
 a catchment surface supported by the platform;
 a permeable toileting surface atop the catchment surface;
 a rinsing element coupled with the animal toileting device that directs rinsing liquid to the permeable toileting surface, the rinsing element comprising a fitting for a water source, which fitting is connected with plumbing underneath the catchment surface, and a sprinkler head connected with the plumbing, wherein the sprinkler head penetrates the catchment surface and the permeable toileting surface, wherein the rinsing element has a rinsing liquid discharge orifice that is at or just above the permeable toileting surface;
 a drain opening located in the catchment surface; and
 a collection element to collect material draining through the drain opening.

4. The animal toileting device of claim 3, further comprising:
 a targeting element.

5. The animal toileting device of claim 3, wherein the collection element comprises:
 a disposal tube adapted to fit the drain.

6. The animal toileting device of claim 3, wherein the platform further comprises:
   substantially vertical surfaces,
   a lip that at least partially surrounds the catchment surface, and
   draft angles on the substantially vertical surfaces.

7. The animal toileting device of claim 3, wherein the catchment surface has a plurality of widely-spaced drainage channels that slope down toward the drain.

8. The animal toileting device of claim 1, wherein the permeable toileting surface comprises artificial turf.

9. The animal toileting device of claim 1, wherein the permeable toileting surface comprises sod.

10. The animal toileting device of claim 3, wherein the permeable toileting surface comprises artificial turf.

11. The animal toileting device of claim 3, wherein the permeable toileting surface comprises sod.

\* \* \* \* \*